United States Patent [19]

Apter et al.

[11] 4,335,990
[45] Jun. 22, 1982

[54] KNOCK DOWN BARREL HANDLING APPARATUS

[75] Inventors: Robert F. Apter, Wyncote; Carl Apter, Ambler; Joseph Soliday, North Wales, all of Pa.

[73] Assignee: R. A. Industries, Inc., Lansdale, Pa.

[21] Appl. No.: 209,558

[22] Filed: Nov. 24, 1980

[51] Int. Cl.³ .............................................. B62B 1/08
[52] U.S. Cl. ................................ 414/457; 280/47.12; 280/47.17; 280/47.37 R
[58] Field of Search .......... 280/47.12, 47.34, 47.37 R, 280/47.13 R, 47.17, 47.33; 414/457; 248/129

[56] References Cited

U.S. PATENT DOCUMENTS

| | | | |
|---|---|---|---|
| 1,274,152 | 7/1918 | Ells | 280/47.12 |
| 1,738,096 | 12/1929 | Cole | 280/47.37 R X |
| 1,866,887 | 7/1932 | Gleason et al. | 280/47.12 |
| 3,642,301 | 2/1972 | Crawford | 280/47.12 |

Primary Examiner—Joseph F. Peters, Jr.
Assistant Examiner—Donald W. Underwood
Attorney, Agent, or Firm—Seidel, Gonda, Goldhammer & Panitch

[57] ABSTRACT

Barrel handling apparatus which includes a cradle having handles, a pair of side rails, and wheels for supporting the side rails is structurally interrelated so as to facilitate knock down of the apparatus to minimize the volume needed in order to package and ship the apparatus. The wheels are removably connected to the side rails. The side rails are removably connected to the cradle. A cross brace is removably connected to the cradle and side rails.

4 Claims, 5 Drawing Figures

KNOCK DOWN BARREL HANDLING APPARATUS

BACKGROUND

Barrel handling apparatus of the type involved herein is old and well known in the art. The various components of the prior art apparatus are welded together whereby a container of substantial size is needed in order to ship the apparatus. Such container exceeds that which would be acceptable by a delivery surface such as United Parcel. The present invention is directed to a solution of how to structurally interrelate the components of the apparatus whereby it can be knocked down for purposes of shipment to a size whereby its weight is less than 50 pounds and will be accepted by a shipping surface such as United Parcel.

SUMMARY OF THE INVENTION

The knock down barrel handling apparatus of the present invention includes a cradle having side rails rigidly connected together by downwardly angled front and rear braces. A pair of upstanding lift flanges are provided at one end of the cradle. Each flange is connected to one of the rails. A handle is telescoped into each rail. An adjustable lock is provided on the cradle for engaging one end of a barrel while the opposite end of the barrel is engaged with said flanges. Applicants have elected not to make any changes in the basic structure of the cradle for purposes of knock down. Instead, applicants have elected to knock down other components of the handling apparatus.

Each rail has a set of channels including a front channel adjacent one of the lift flanges and a rear channel. The channels of each set have open sides facing each other. Angled struts rigidly and fixedly join each front channel to the front brace on the cradle.

A side frame is associated with each rail. Each side frame has a rear leg received within the rear channel and a front leg received within the front channel of its associated rail. Fastener means removably connect each side rail leg to the mating channel on its associated rail. Two sets of wheels are removably connected to a horizontal portion of each side rail. A cross brace has its upper ends removably fastened to the rear channel on each side rail and to the rear legs of the side frames. The lower ends of the cross brace are removably fastened to the lower ends of the rear legs of the side frames.

It is an object of the present invention to structurally interrelate the components of barrel handling apparatus in order to render the same knock down for purposes of shipping in a manner which is simple, reliable, and inexpensive.

It is another object of the present invention to provide a knock down barrel handling apparatus in a manner which does not interfere with the ability of the apparatus to perform its intended function while at the same time substantially minimizing the shipping costs and the manufacturing costs of the apparatus.

Other objects and advantages will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
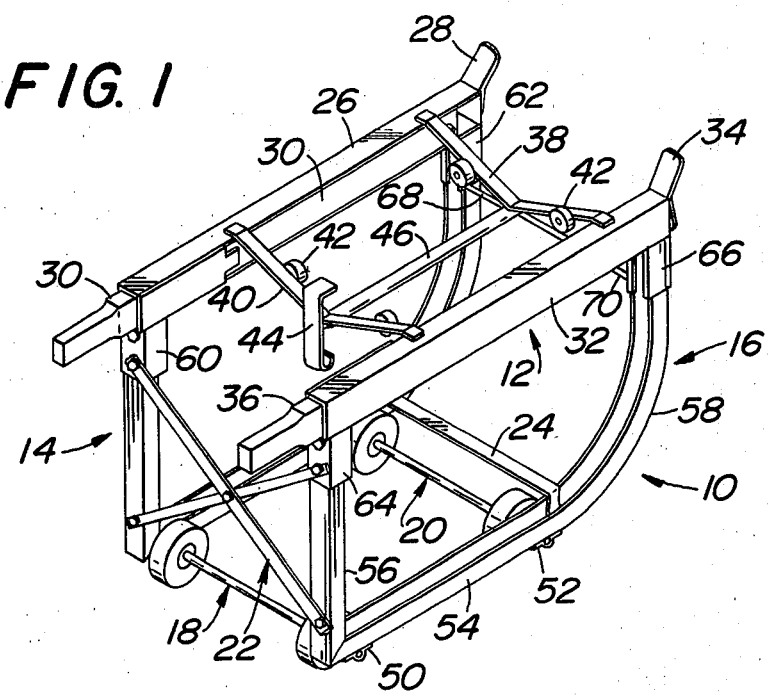
FIG. 1 is a perspective view of apparatus in accordance with the present invention.

Referring to the drawing in detail, wherein like numerals indicate like elements, there is shown a knock down barrel handling apparatus of the present invention designated generally as 10. Apparatus of this general type and having the general appearance shown in FIG. 1 is known with the components being slightly different from that shown in FIG. 1 and welded or otherwise fixedly secured together so as to require a large shipping container. A typical shipping container for prior art apparatus has the following minimum dimensions: 43 inches long, 26 inches high, and 20 inches wide. Various components of the prior art have been modified so that the apparatus 10 may be knocked down for shipment to a size which will be accepted by delivery service such as United Parcel.

Referring to FIG. 1 in the drawing, there is shown apparatus in accordance with the present invention designated generally as 10. The apparatus 10 includes the following major components: a cradle 12, side frame 14, side frame 16, sets of wheels 18 and 20, a rear frame brace 22 and a front frame brace 24.

The cradle 12 in accordance with the present invention is integral as an entity and separable from the remainder of the apparatus. The cradle 12 includes a side rail 26 having a lift flange 28 at one end and a handle 30 telescopically arranged at the other end. Rail 30 is preferably a channel with its open side extending for substantially the entire length on the inner surface thereof. The cradle 12 includes a similar side rail 32 having a lift flange 34 at one end and a handle 36 telescopically arranged at the other end. The rails 26, 32 are rigidly interconnected by an angled front brace 38 and an angled rear brace 40. The braces 38 and 40 may have rollers 42 as shown.

Figure 2:
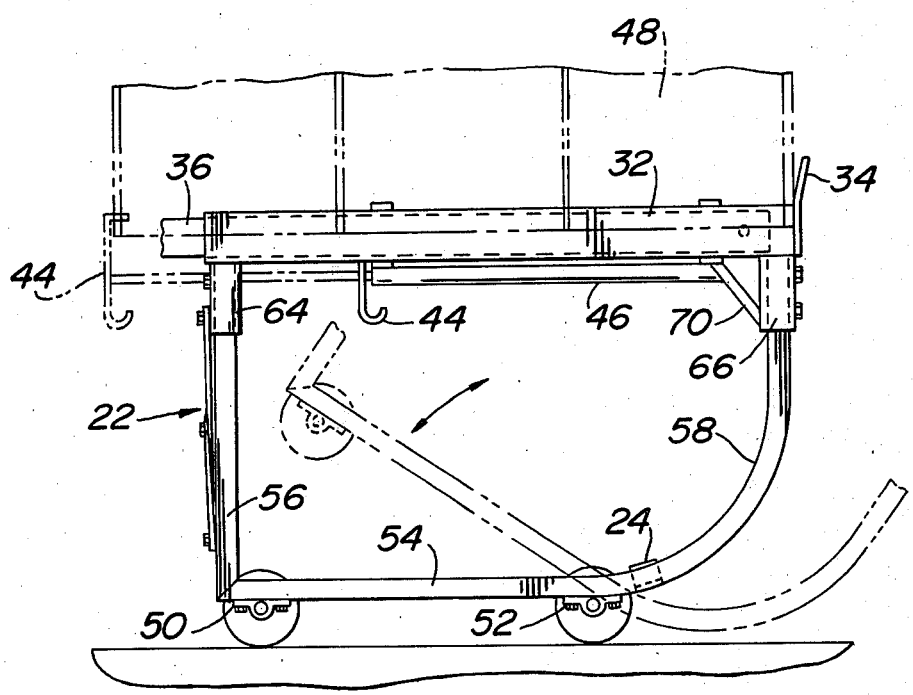
FIG. 2 is a side elevation view of the apparatus shown in FIG. 1.
Figure 3:
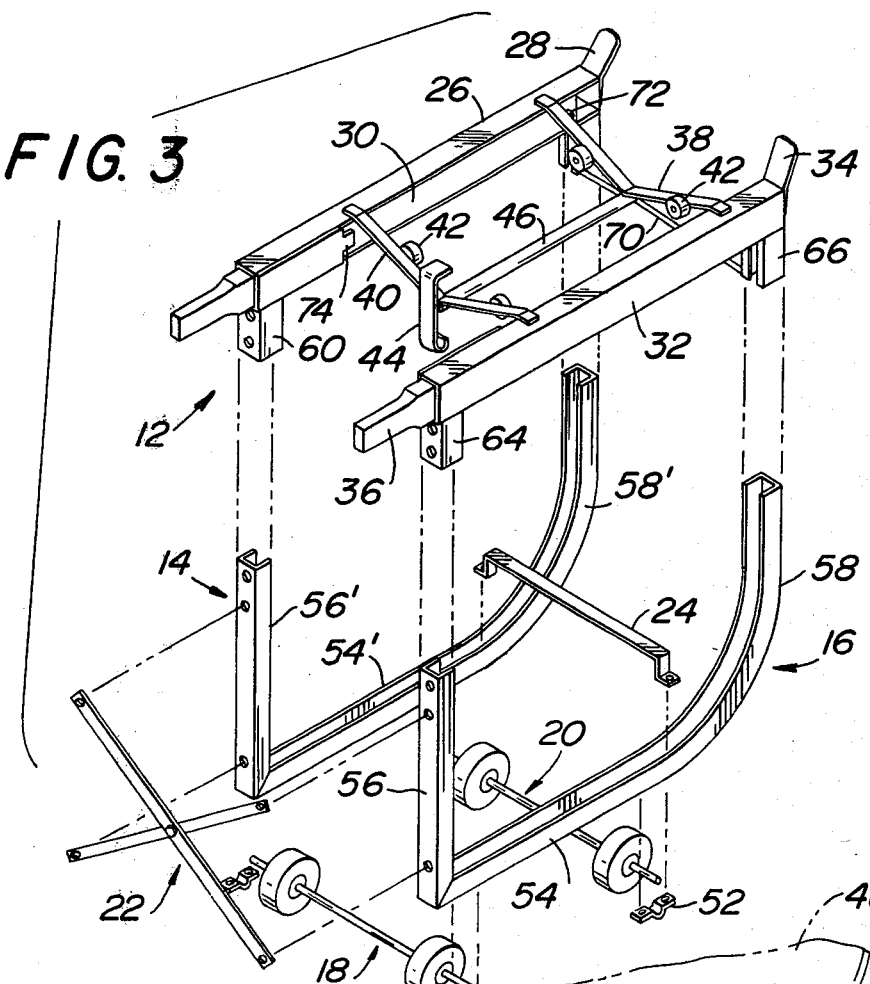
FIG. 3 is an exploded view of the apparatus shown in FIG. 1.

A lock 44 is provided. Lock 44 has an exposed handle end with either a straight flange or a curved flange at its opposite ends. Intermediate its ends, the lock 44 is telescopically arranged within the cylinder 46. Cylinder 46 is supported by the braces 38, 40. Either end of the lock 44 may be in an upper position for engagement with a lip on a drum or barrel 48 depending upon the shape of the lip of the drum or barrel 48. Lock 44 engages one end of the drum or barrel 48 while the opposite end is in contact with the lift flanges 28, 34. See FIG. 2.

The side frames 14 and 16 are identical. Only side frame 16 will be described in detail with corresponding elements identified by corresponding primed numerals. Side frame 16 is preferably channel-shaped with a horizontal portion 54 arranged to support the set of rear wheels 18 and the set of front wheels 20. The set of rear wheels 18 is removably attached to the horizontal portions 54, 54' by removable bearings 50. The set of front wheels 20 is similarly attached by removable bearings 52. The bearings 50, 52 are removably bolted to the bight of the channel-shape of the portion 54.

The side frame 16 includes an upstanding rear leg 56 and an upstanding front leg 58. Front leg 58 may be connected to the horizontal portion 54 by a curved section as shown in the drawings. The front frame brace 24 is removably bolted to the side frames 14, 16 at a location forwardly of the front wheels 20.

When made from channels, the open side of the legs 56, 58 face each other. The cradle rail 30 is provided with downwardly extending channels 60, 62 at its respective ends. Channel 60 is designed so as to telescopically receive the upper end of leg 56'. Channel 62 is designed to telescopically receive the upper end of leg 58'. Rail 32 is provided with a downwardly extending front channel 66 and a downwardly extending rear channel 64. The open side of the channels 64, 66 face each other in the same manner that the open side of the channels 60, 62 face each other. The channels 60, 62, 64 66 can have a length of about 4 inches and the open side of the channels are preferably about ⅛ inch wider than the closed side or bight.

Channel 64 telescopically receives the upper end of leg 56. Channel 66 telescopically receives the upper end of leg 58. Each leg is removably bolted to its associated channel depending from the cradle 12. Since the channels 60, 62, 64 and 66 are open on their inner side, they accommodate any deviations from manufacturing tolerances with respect to the side frames.

Figure 4:
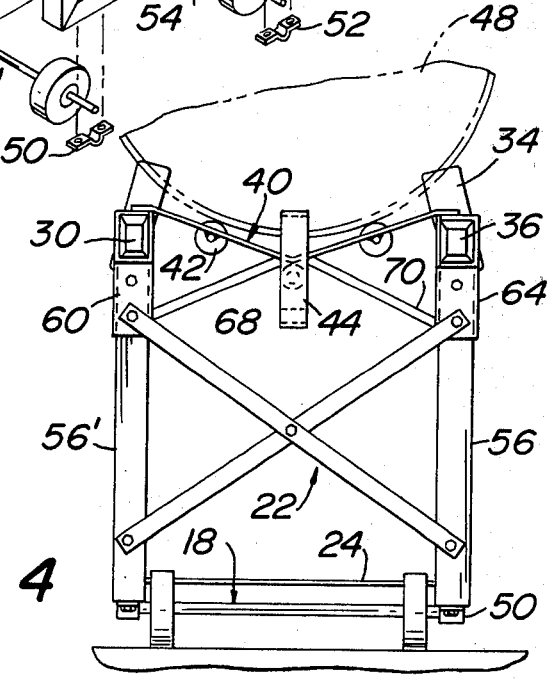
FIG. 4 is a rear elevation view of the apparatus shown in FIG. 1.

A strut 68 has one end welded to the front channel 62 and its other end welded to the front brace 38. A similar strut 70 has one end welded to the front channel 66 and its other end welded to the brace 38. See FIG. 4 for the angular disposition of the braces 68, 70 with respect to the front brace 38 and rear brace 40.

The rear frame brace 22 is a cross brace with the members pivotably coupled together at the area where they overlap one another. The lower ends of the cross brace 22 are removably bolted to the lower ends of the side frames 14 and 16. The upper ends of the cross brace 22 are removably bolted to the lower ends of the channels 60, 64 and the legs 56', 56 respectively. All of the fasteners are preferably of the bolt and nut type so that a readily available conventional wrench may be utilized to assemble the apparatus 10 without any other special tooling.

Figure 5:
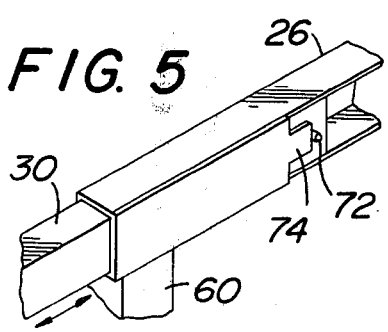
FIG. 5 is a partial perspective view showing a handle in an extended position.

Each of the handles 30, 36 is preferably telescoped with respect to its associated rail. Each handle preferably has a projection 72 adjacent the front end of the apparatus 10 and extending inwardly. Each rail 26, 32 has a limit stop 74 for limiting the extent to which the handle may be withdrawn from its associated rail. See FIG. 5.

The present invention knocks down the apparatus 10 into the following major components: cradle 12, side frames 14 and 16, rear frame brace 22, front frame brace 24, and the wheel sets 18 and 20. The wheels of the wheel sets 18 and 20 are removable from their support shafts. The present invention facilitates knock down of the apparatus 10 to a package 43 inches long, 8 inches high, and 19 inches wide while being less than 50 pounds in weight. The present invention does not attempt to knock down the cradle but rather knocks down all of the components with respect to the cradle which may then overlie the side frames in the knock down package. Each leg of each side frame is connected to its associated channel on the cradle with two fasteners, one of which also connects each leg of the side frame with the upper ends of the rear brace 22.

The present invention may be embodied in other specific forms without departing from the spirit or essential attributes thereof and, accordingly, reference should be made to the appended claims, rather than to the foregoing specification, as indicating the scope of the invention.

We claim:

1. A knock down barrel or drum handling apparatus comprising a cradle which includes side rails rigidly connected together by inwardly and downwardly angled front and rear braces, a pair of upstanding lift flanges at one end of said cradle, each flange being connected to one of said rails, a handle telescoped into each rail, each rail having a set of downwardly extending channels including a front channel adjacent one of said lift flanges and a rear channel, the channels of each set having open sides facing each other, angled struts rigidly and fixedly joining each front channel to said front brace, a side frame associated with each rail, each side frame having a rear leg received within the rear channel and a front leg received within the front channel of its associated rail, fastener means removably connecting each side rail leg to the mating channel on its associated rail, front and rear sets of wheels removably coupled to a horizontal portion of each side rail, a crossed brace having its upper ends removably fastened to the rear channels and to rear legs of said side frames, the lower ends of said cross brace being removably fastened to lower ends of said rear legs of said side frames, whereby the apparatus may be knocked down without disconnecting any portion of the cradle and while disconnecting the side rails from all components connected thereto.

2. Apparatus in accordance with claim 1 including a front brace removably bolted across said side frames at a location forwardly of said front set of wheels.

3. Apparatus in accordance with claim 1 including an adjustable lock on said cradle for engaging one end of a barrel or drum while the opposite end is engaged with said flanges.

4. Apparatus in accordance with claim 1 wherein said channels are slightly wider at their open sides.

* * * * *